May 29, 1962  
J. G. LORD  
3,036,684  
TOLL COLLECTING MACHINE  
Filed July 16, 1959  
5 Sheets-Sheet 1

INVENTOR.  
JOHN G. LORD  
BY  
*Louis Necho*  
ATTORNEY.

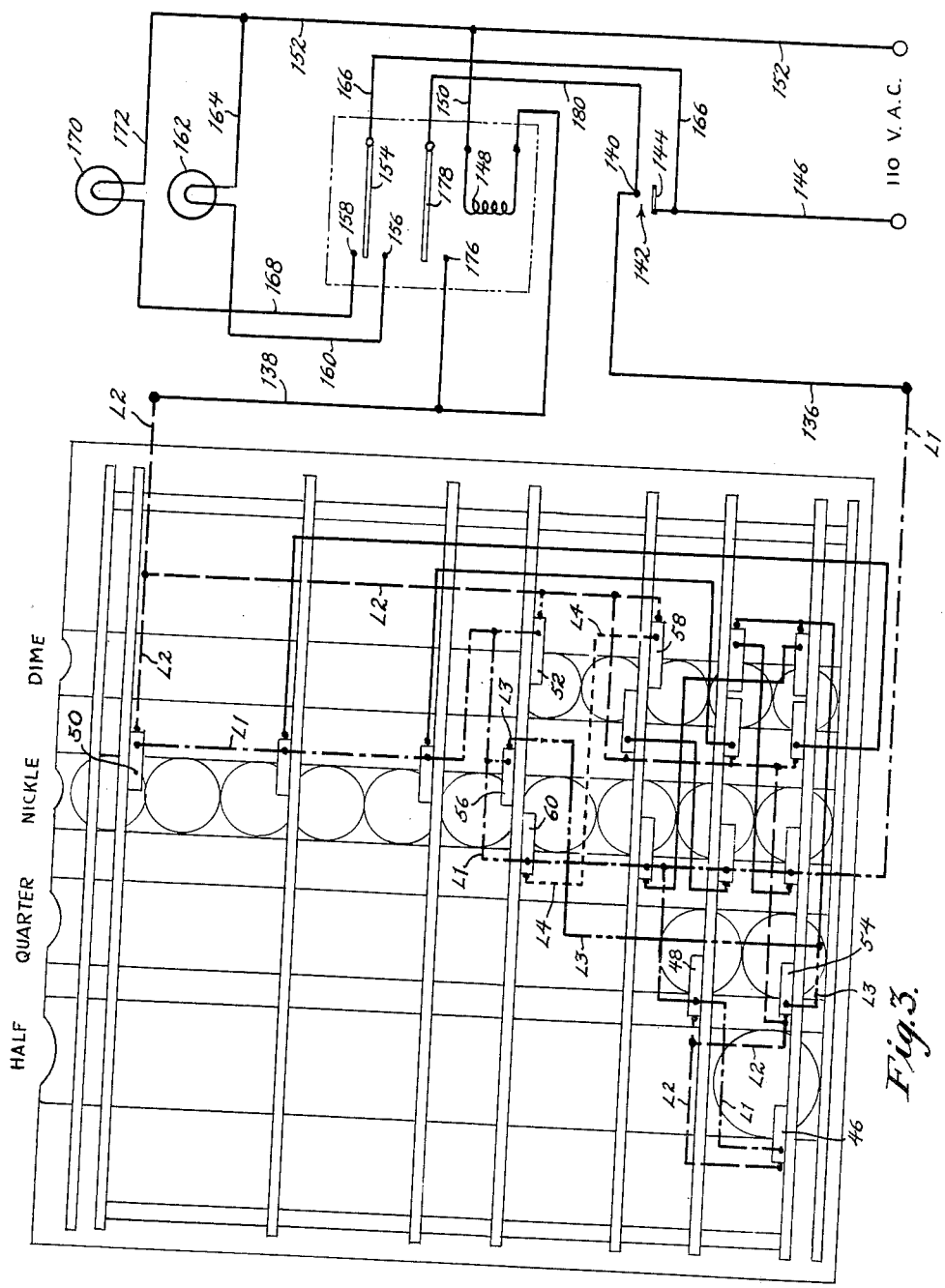

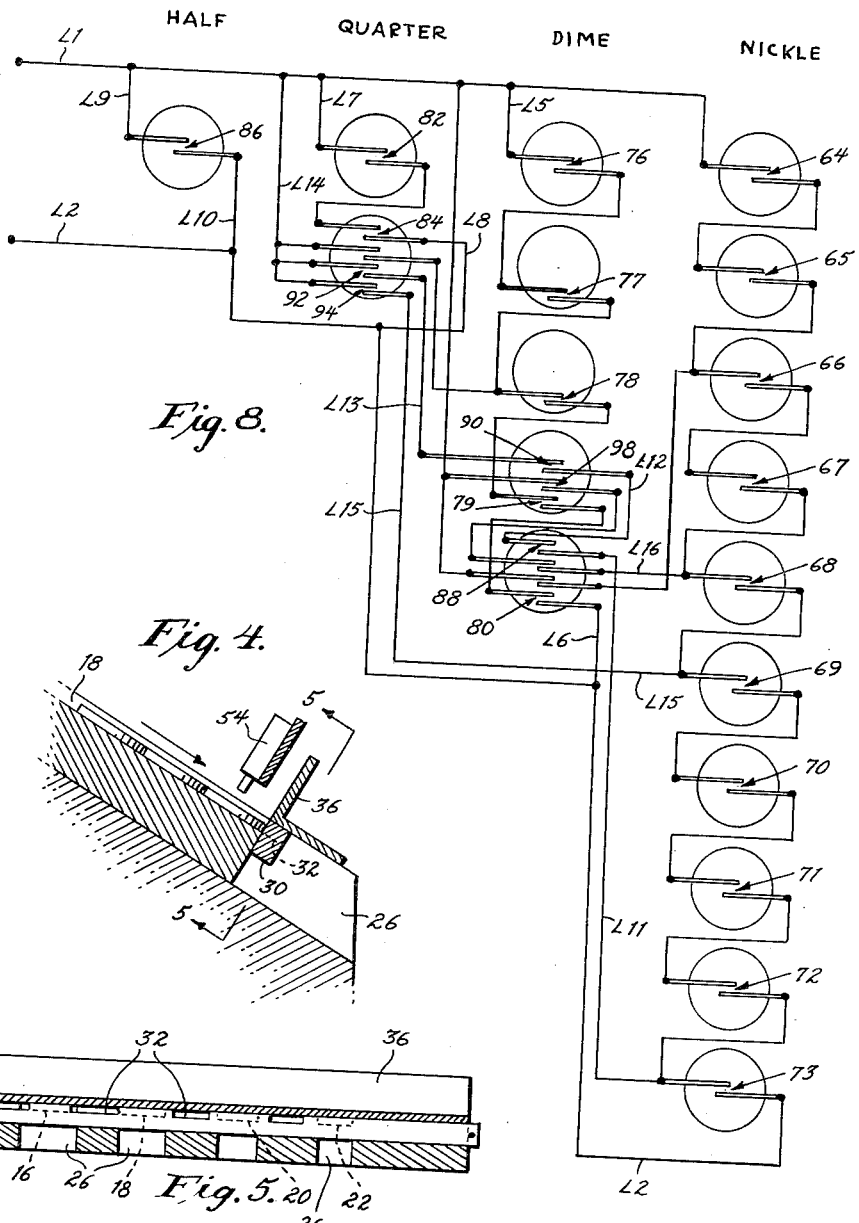
Fig. 8.
Fig. 4.
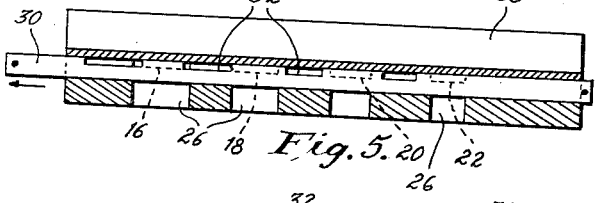
Fig. 5.
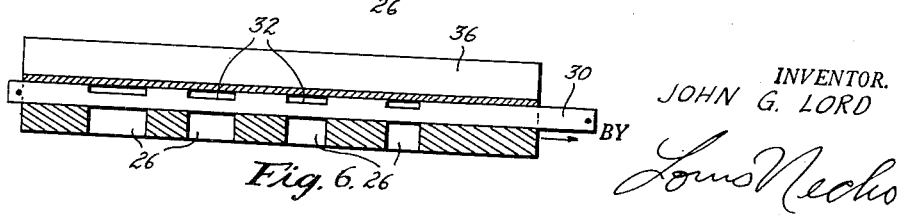
Fig. 6.
INVENTOR.
JOHN G. LORD
ATTORNEY.

May 29, 1962

J. G. LORD 3,036,684

TOLL COLLECTING MACHINE

Filed July 16, 1959

INVENTOR.
JOHN G. LORD
BY
*Louis Necho*
ATTORNEY.

May 29, 1962 J. G. LORD 3,036,684
TOLL COLLECTING MACHINE
Filed July 16, 1959 5 Sheets-Sheet 5

INVENTOR.
JOHN G. LORD
BY
ATTORNEY.

United States Patent Office 3,036,684
Patented May 29, 1962

3,036,684
TOLL COLLECTING MACHINE
John G. Lord, Swarthmore, Pa., assignor to Shoup Toll Collecting Devices, Inc., Crumlyn, Pa., a corporation of Pennsylvania
Filed July 16, 1959, Ser. No. 827,468
1 Claim. (Cl. 194—9)

My invention relates to a machine for receiving and counting coins of different denominations and for activating one signal if the total value of the coins received is correct and for activating a different signal if said value is incorrect.

Machines for this purpose have heretofore been made, but, so far as I am aware, all such machines include photoelectric cells and/or various kinds of electronic valves, and other electronic devices which are expensive to install and service. Also, the operation of machines which depend on electronic components, can be affected by radiation and other electromagnetic disturbances.

The object of this invention is to produce a simple apparatus for receiving and counting coins of different denominations and for activating one signal if the value of the coins received is correct and to activate another signal if the value of the coins received is not correct, without the use of any of the electronic components whatever.

More specifically, my invention relates to a machine of the character stated in which the presence of coins of the proper denominations is detected mechanically and in which the presence of said coins closes corresponding switches which complete selected electric circuits to energize one, or the other of said signals.

The full nature of the invention will be understood from the following specification and the accompanying drawings in which:

FIG. 3 is an elevational view of the mechanism shown in FIG. 1 provided with a set of switches and circuits which are adapted to be closed by the presence of one assortment of coins and which are used for individual, or controlled operation of the machine.

FIG. 4 is a sectional view looking in the direction of line 4—4 on FIG. 1.

FIG. 5 is a sectional view looking in the direction of line 5—5 on FIG. 4 showing the parts in one position.

FIG. 6 is similar to FIG. 5 but showing the parts in the opposite position.

FIGS. 8, 9 and 10 are diagrammatic views of other circuits which are adapted to be closed by other assortments of coins and which are used for continuous, or uncontrolled operation of the machine.

Figure 1:
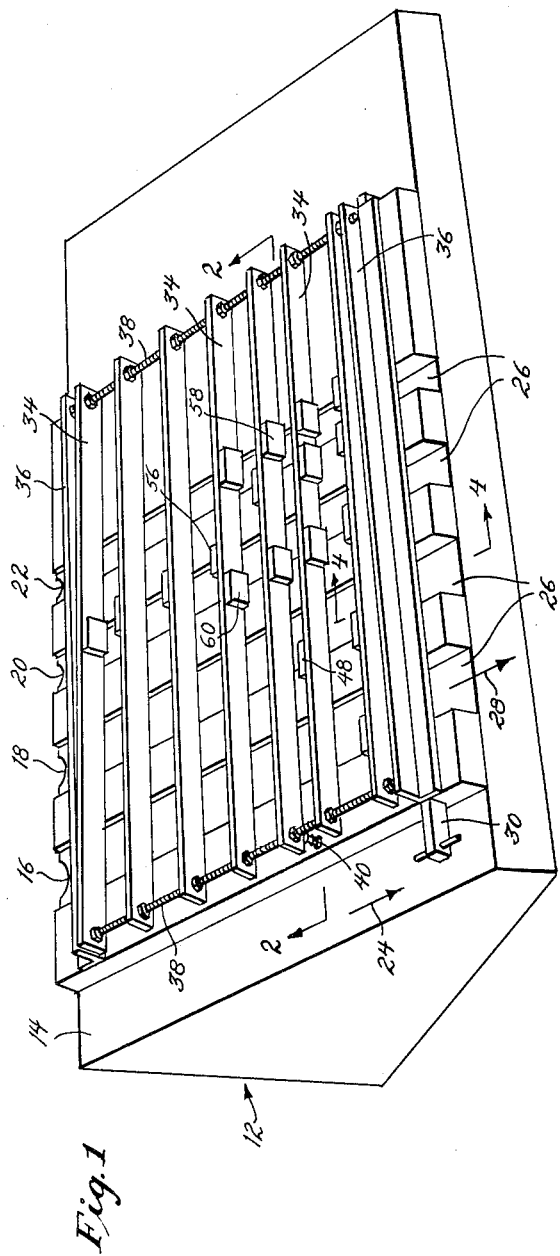
FIG. 1 is a perspective view of the coin detecting and counting mechanism forming part of the machine embodying my invention.
Figure 2:
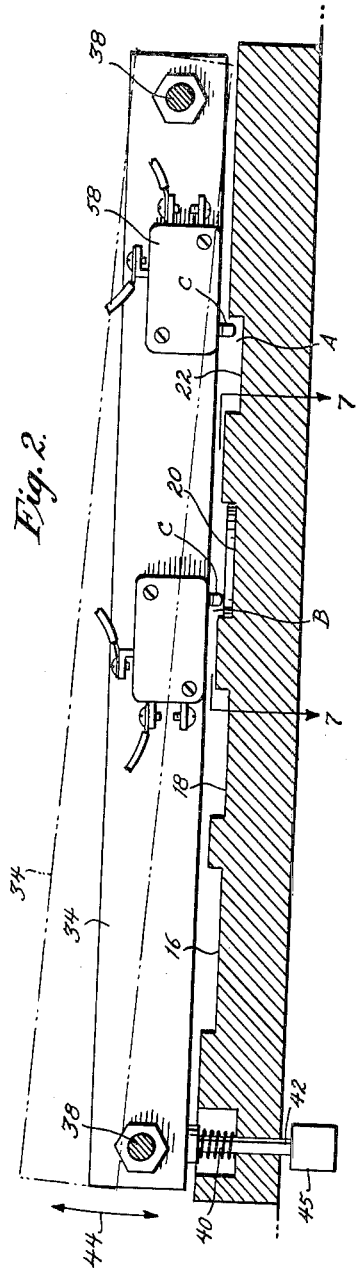
FIG. 2 is an enlarged sectional view looking in the direction of line 2—2 on FIG. 1.

Referring to FIGS. 1, 2 and 3, the apparatus includes a suitable frame 12 which has a slanting supporting surface 14 which carries a number of chutes 16, 18, 20 and 22 for receiving coins of various denominations. The slant of the chutes is enough to cause the coins to move downwardly through their respective chutes or in the direction of arrow 24 in FIG. 1.

The lower ends of the chutes are provided with openings 26 (FIG. 5) through which the coins may fall, as indicated by arrow 28 in FIG. 1, after it has been determined that the correct fare has been paid. In order to retain the coins in the chutes until this determination has been made, I provide slide bar 30 which has spaced openings 32 and which is movable to the position of FIG. 5 in which openings 32 are out of registration with openings 26 to retain the coins in the chutes or to the position of FIG. 6 in which openings 32 register with openings 26 and permit the coins to drop out of the chutes.

The coins of various denominations may be deposited in the corresponding chutes manually or by means of a coin sorting apparatus into which mixed coins constituting the required fare are deposited and which delivers fifty cent pieces to chute 16, quarters to chute 18, nickels to chute 20 and dimes to chute 22, as shown in FIG. 3, or in any other order. Since the coin sorting machine apparatus referred to does not form part of the present invention, and is not being claimed, it is not shown nor described.

The presence of coins in the chutes is detected by suitably arranged micro-switches which will hereinafter be specifically referred to. At this point it is sufficient to say that each micro-switch has a contact arm C which is springloaded and normally assumes an outer, or a switch opening position and which, when moved inwardly, relative to the switch body, closes the switch. Also, the length of each contact and the depth of the chute are such that, if a coin is present at a location corresponding to one of the switches, as at B, in FIG. 2, the switch will be closed. On the other hand, if there is no coin, as at A, the micro-switch will remain open. The micro-switches are carried by bars 34 which are mounted on rods 37 and 38 which are braced by angles 36 to form a grid which is shown in FIGS. 1 and 2. The right hand end of the grid is hinged to support 14 in any suitable manner, not shown, and the left hand end thereof is normally biased away from support 14 or to the broken line position of FIG. 2, by spring 40, and it is moved toward support 14, or to the solid line position of FIG. 2, manually, or mechanically, or by means of a solenoid 45 the armature 42 of which is connected to rod 37 so as to move the grid, against the action of 40 every time the solenoid is energized. Since the manner in which the grid is moved forms no part of the present invention, it is sufficient to say that the grid is reciprocated in the direction of arrow 44 in FIG. 2.

In one embodiment of the invention the grid is moved toward the chutes, or to the solid line position of FIG. 2, only after one or more coins are deposited in one of the chutes and is stationary in the broken line position of FIG. 2 the rest of the time. This can be done by connecting the micro-switches to solenoid 45 whereby the solenoid is energized whenever any coin is deposited in any of the chutes. In another embodiment of the invention, the grid is continuously reciprocated between the solid and broken line positions of FIG. 2 by a rotary, or cam switch which continuously energizes and de-energizes the solenoid. Since the mechanism by which the grid carrying the mico-switches is reciprocated is not claimed and, since anyone skilled in the art can produce a satisfactory arrangement without the exercise of inventive talent, it is though unnecessary to show or describe any particular mechanism.

The switches and circuits used when the grid is moved to its coin detecting position only after coins have been deposited in the chutes are shown in FIG. 3 which shows the apparatus prepared for collecting a fifty cent fare made up of a fifty cent piece, or of various combinations of quarters, dimes and nickels. By inspection of FIG. 3 it will be seen that the presence of a fifty cent piece in chute 16 closes switch 46 and connects wires L–1 and L–2 for a purpose hereinafter set forth. Likewise closing switch 48 by the upper of two quarters in chute 18, or switch 50 by the uppermost of 10 nickels in chute 20, or switch 52 by the uppermost of 5 dimes in chute 22, also electrically connects lines L–1 and L–2. Since the presence of a quarter in registration with switch 48 insures the presence of another quarter therebelow and since the presence of a nickel in registration with switch 50 indicates the presence of 9 nickels therebelow, and since the presence of a dime in registration with switch 52 indicates the presence of 4 dimes therebelow, closing any one of the switches mentioned is enough to indicate that the proper number of coins of the proper denomination have been deposited. It will be noted that the presence of more than one fifty cent piece, or of more than two quarters, or of more than ten nickels, or of more than five dimes will not affect the operation of the machine and the only loser will be the party who deposits coins in excess of the number required.

In order to enable the machine to accept a fare composed of coins of various denominations such as nickels and quarters, dimes and nickels, or other combinations, I provide additional switches which are arranged to be closed by selected coins of selected denominations. For example, closing switch 54, which registers with a quarter at the bottom of the chute, will connect line L–3 to line L–2 and closing switch 56 which registers with the fifth nickel from the bottom of the chute, connects line L–3 to line L–1, thus completing the circuit through lines L–1 and L–2 and permitting payment of the fifty cent fare by means of one quarter and five nickels. Likewise, closing switch 58 by the third dime from the bottom of the chute connects line L–4 to L–2, and closing switch 60 by the fourth nickel from the bottom of the chute, connects line L–4 to line L–1 thus again completing the circuit through lines L–1 and L–2 and permitting the payment of a fifty cent fare with three dimes and four nickels. The other switches shown in FIG. 3 permit the payment of the fifty cent fare with other combinations but since the manner in which this is done is readily understood by one skilled in the art, it is thought unnecessary to describe all possible combinations.

When the grid is reciprocated continuously, the arrangement of FIG. 3 will not do because the first quarter, while it is moving down to the bottom of chute 18 will close switch 48 and will indicate the presence of two quarters when, in fact, there is only one and the same is true of a single nickel closing switch 50 or a single dime closing switch 52. Furthermore, when the grid is reciprocated continuously, a coin moving down the chute will close other switches which register with said chute thus further falsifying the result.

In order to overcome this difficulty, other arrangements of switches and circuits have been devised.

For example, the arrangement shown in FIG. 8 includes ten series connected switches 64 to 73, the uppermost of which is connected directly to line L–1 and the lowermost of which is connected directly to line L–2 and, therefore, there must be ten nickels before lines L–1 and L–2 can be connected. Likewise, there are five switches 76 to 80 which must be closed by five dimes with the uppermost switch connected by line L–5 to line L–1 and with the lowermost switch connected by line L–6 to line L–2. Similarly closing switches 82 and 84 by two quarters with switch 82 connected to line L–1 by line L–7 and with switch 84 connected to line L–2 by line L–8, connects lines L–1 and L–2. Switch 86 which is closed by a single fifty cent piece is connected to line L–1 by line L–9 and to line L–2 by line L–10.

To enable the machine to accept a fifty cent fare composed of nickels and dimes, nickels and quarters and so on, all of the switches mentioned, except switch 86 which is self sufficient, can be suitably interconnected.

For example, one nickel can be deposited to close switch 73, one side of which is connected to line L–2 and the other side of which is connected by line L–11 to one side of switch 88. If switch 88 is closed by a dime, it connects line L–11 to line L–12 which is connected to one side of switch 90. If switch 90 is closed by a second dime, it connects line L–11 to line L–13 which is connected to one side of switch 92. If switch 92 is closed by a quarter, its other side will be connected by line L–14 to line L–1. In other words line L–1 is connected through line L–14, switch 92 (quarter), through switch 90 (second dime), through switch 88 (first dime), and through switch 73 (nickel) to line L–2.

By way of further example, closing switches 69 to 73, inclusive by the presence of five nickels in the chute connects one side of switch 69 to line L–2 through the switches therebelow. The other side of switch 69 is connected to line L–1 through line L–15 and switch 94 which is closed by a quarter and which is connected to line L–1 by previously mentioned line 14. By way of still further example, if switches 68 to 73 are closed by the presence of six nickels in the chute, and if two dimes have been deposited in the next chute, line L–2 will be connected to line L–1 through line L–16, switch 96 (closed by the lower dime), line L–17, switch 98 (closed by the upper dime) and line L–18 to line L–1. This completes the circuit through lines L–1 and L–2 and permits payment of a fifty cent fare with six nickels and two dimes. The other circuits shown in FIG. 8 permit the payment of the fifty cent fare by other coin combinations but, since these circuits are readily understood, it is thought unnecessary to describe them in detail. It is only necessary to point out that not all of the possible circuits have been shown in FIG. 8.

Figure 9:
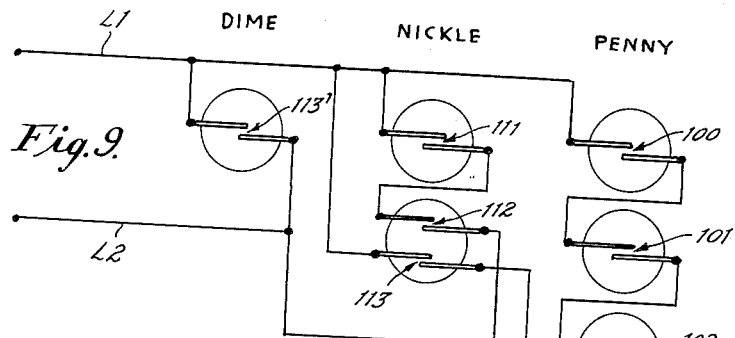

In FIG. 9 is shown a circuit which adapts the machine for collecting a ten cent fare in pennies, or in nickels or in dimes. In this arrangement, when switches 100 to 109 are closed by ten pennies, lines L–1 and L–2 will be connected. Likewise, closing switches 111 and 112 by two nickels or closing switch 113 by one dime, will connect lines L–1 and L–2. To permit payment with five pennies and one nickel, one side of switch 105 which is closed by the fifth penny from the bottom of the chute is connected, through line L–20, to switch 113, which is also closed by a nickel, and by line 21 to line L–1. The other side of switch 105 is connected to line L–2 through the switches therebeneath which are closed by nickels registering therewith.

Figure 10:
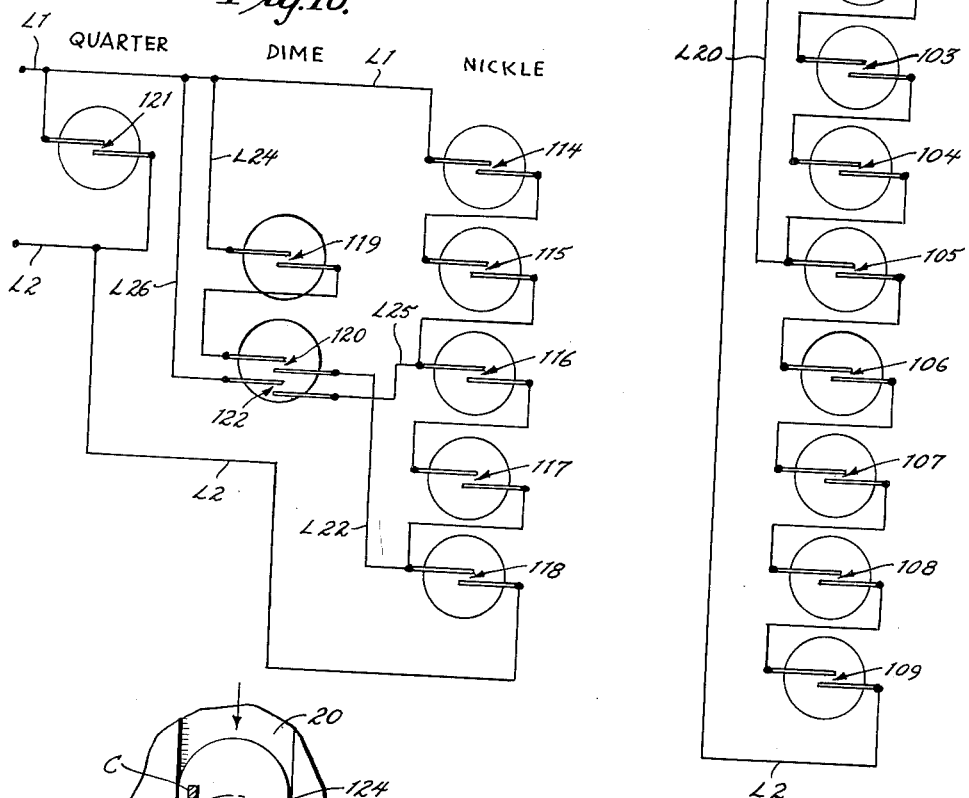

In FIG. 10 a circuit is shown for adapting the machine for collecting a twenty-five cent fare. This circuit includes switches 114 to 118 which are adapted to be closed by as many nickels; switches 119 and 120 which are adapted to be closed by dimes and switch 121 which is adapted to be closed by a quarter. To collect one nickel and two dimes, lines L–2 and L–1 are connected through switch 118, line L–22, switch 122, line L–23, switch 119 and line L–24. To collect three nickels and one dime, lines L–1 and L–2 are connected by switch 116, line L–25, switch 122 and line L–26.

Figure 7:
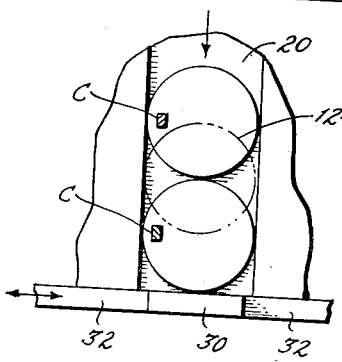
FIG. 7 is a fragmentary elevational view showing the manner in which one coin is prevented from closing more than one switch.

In order to make it impossible for any one coin to be engaged simultaneously by the contact arms C of any two adjacent switches, I off-set the contact arms C of the various switches with reference to coins in the manner shown in FIG. 7. By this arrangement the contact arms engage the peripheries of the coins whereas, if the contact arms were centrally located, both of the contact arms shown in FIG. 7 will be engaged by coin 124.

Figure 11:
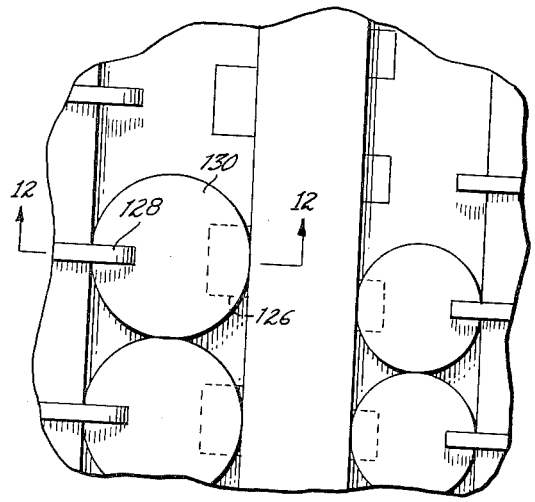
FIG. 11 is an elevational view showing a first modification of the detecting mechanism.
Figure 12:
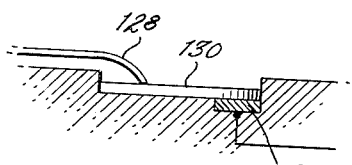
FIG. 12 is a section taken on line 12—12 on FIG. 11.

In FIGS. 11 and 12, I show a modification in which a conductor 126 is embedded in each shute and is connected to one side of the circuit, such as to line L–1, and a feeler 128 which is connected to the other side of the circuit, such as line L–2, is used to engage the coin 130 which also engages conductor 126.

Figure 13:
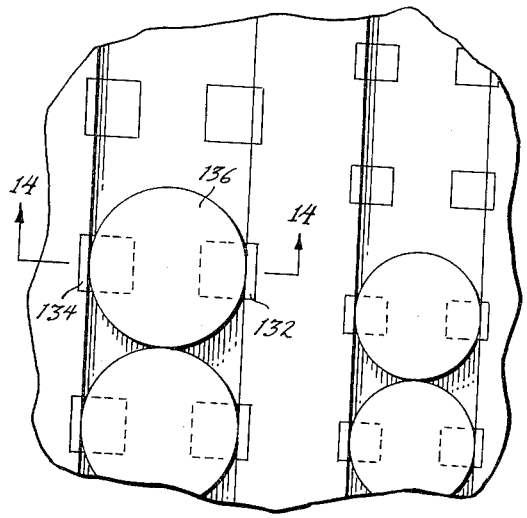
FIG. 13 is an elevational view showing a second modification of the detecting mechanism.
Figure 14:
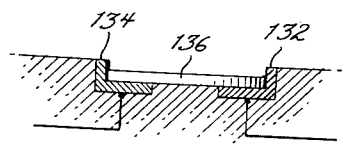
FIG. 14 is a sectional view taken on line 14—14 on FIG. 13.

In FIGS. 13 and 14, I show a still further modification in which two conductors 132 and 134 are embedded in each chute and are wired to opposite sides of a circuit, or to lines L–1 and L–2. In this arrangement, the coin 134 bridges the gap between the two conductors to complete the circuit through lines L—1 and L–2.

In all of the circuits referred to, line L–1 is ultimately connected to line 136, and line L–2 is connected to line 138 which, in effect, are extensions of lines L–1 and L–2. As will be seen from FIG. 3, line 136 is connected to one side 140 of a switch 142, the other side 144 of which is connected to one side 146 of a live A.C. circuit. Line 138 is connected to one side of a relay 148, the other side of which is connected by line 150 to the other side 152 of said A.C. circuit. By this arrangement, closing switch 142, which may be closed by the weight of a person or a car, etc., will energize relay 148 and vice versa.

Associated with relay 148 is a two position switch the contact arm 154 of which is selectively engageable with contact arm 156 or with contact arm 158. Contact arm 156 is connected by line 160 to a green light 162, the other side of which is connected by line 164 to one side 152 of the live A.C. circuit, the other side 146 of which is connected by line 166 to contact arm 154. By this arrangement, as long as contact arm 154 engages contact arm 156, the green light 162 will be energized. Contact arm 158 is connected by line 168 to one side of a red light 170, the other side is connected by line 172 to side 152 of the A.C. circuit. Therefore, when contact arm 154 engages with contact arm 158, the red light will be energized and the green light will be de-energized. In practice, by spring loading, or otherwise, and as long as relay 148 is not energized, contact arm 154 will engage contact 158. But when relay 148 is energized, contact arm 154 will be pulled downwardly to disengage it from contact 158 and to engage it with contact 156. But, since one side of switch 142 is connected to line 136, the relay cannot be energized unless (a) switch 142 is closed and (b) unless the circuit has been completed through lines L–1 and L–2.

Switch 142 is adapted to be closed by the weight of a person, the weight of a car or otherwise and as above pointed out, the circuit through lines L–1 and L–2 can only be closed by the deposit of the required fare.

The operation is as follows:

When a person, or car, closes switch 142, and before the correct fare is paid, relay 148 is de-energized and the red light will continue to be energized. When the correct fare is paid, lines L–1 and L–2 are connected to complete the circuit through switch 142 and energize the relay 50 which de-energizes the red light and energizes the green light to authorize the person or the car to pass on.

Also associated with the relay is a holding switch, one contact arm 176 of which is connected to line L–2 through line 138 and the other contact arm of which is connected by line 180 to side 140 of switch 142. By spring loading, or otherwise, contact arm 178 is normally out of engagement with contact arm 176. But, when relay 148 is energized, contact arm 178 will also be pulled down into engagement with contact 176. It will be understood that, like contact arm 154, contact arm 178 cannot move into engagement with contact arm 176 unless (a) switch 142 is closed and (b) lines L–1 and L–2 are connected by payment of the correct fare.

From the foregoing, it will be seen that, in my machine, contacts C of the various switch serve as mechanical feelers which are moved to switch closing position by the presence of a coin to energize one or more circuits so that the entire operation is free of electronic devices.

Switch 142, through spring loading or otherwise, always assumes a normally open position so that, as soon as the pressure on it is relieved, it opens automatically and resets the apparatus for another cycle.

For example, and if the apparatus is used for collecting tools on a superhighway, switch 142 will be connected to a treadle or platform located in the path of the vehicle so that, when a vehicle approaches the toll gate and stops for the payment of the toll, the weight of the vehicle will close switch 142 to energize the red light through lines 146, 166, switch 154, 158, line 168, line 172 and line 152. By this arrangement the motorist will face a red light which will stay red until payment of the required fare closes the circuit through lines L–1 and L–2 and energizes relay 148 which, in turn, de-energizes red light 170 and energizes green light 162 to indicate that the correct fare has been paid and to permit the motorist to proceed. As soon as the car moves off the treadle, switch 142 opens and the circuit is re-set.

What I claim is:

For use in a tool collecting machine, a bank of chutes adapted to receive coins of various sizes, a grid juxtaposed to said bank of chutes, normally open micro-switches carried by said grid, each of said switches registering with, and having a switch arm adapted to enter, one of said chutes, and means for continually reciprocating said grid toward and away from said chutes whereby the presence of a coin in a registering chute actuates the corresponding switch arm to close the corresponding switch.

References Cited in the file of this patent

UNITED STATES PATENTS

| | | |
|---|---|---|
| 659,533 | Kann | Oct. 9, 1900 |
| 1,644,371 | Goldman | Oct. 4, 1927 |
| 1,973,275 | Babson | Sept. 11, 1934 |
| 2,299,820 | Holinger | Oct. 27, 1942 |
| 2,371,260 | Petersen | Mar. 13, 1945 |
| 2,528,790 | Scherer | Nov. 7, 1950 |
| 2,551,730 | DelSol | May 8, 1951 |
| 2,623,933 | Allstadt | Dec. 30, 1952 |
| 2,731,124 | Kaplanowski | Jan. 17, 1956 |
| 2,735,202 | King | Feb. 21, 1956 |
| 2,769,165 | Bower | Oct. 30, 1956 |
| 2,908,895 | Cooper | Oct. 13, 1959 |
| 2,989,736 | Cooper | June 20, 1961 |